(12) United States Patent
Bueno-Bigue et al.

(10) Patent No.: US 6,810,744 B2
(45) Date of Patent: Nov. 2, 2004

(54) METHOD AND DEVICE FOR ASSESSING THE SURFACE CONDITION OF A MATERIAL

(75) Inventors: Marie-Ange Bueno-Bigue, Mulhouse (FR); Stéphane Fontaine, Mulhouse (FR); Marc Renner, Mulhouse (FR)

(73) Assignee: Universite de Haute Alsace, Mulhouse (FR)

( * ) Notice: Subject to any disclaimer, the term of this patent is extended or adjusted under 35 U.S.C. 154(b) by 0 days.

(21) Appl. No.: 10/297,027

(22) PCT Filed: Jun. 8, 2001

(86) PCT No.: PCT/FR01/01770
§ 371 (c)(1),
(2), (4) Date: Nov. 26, 2002

(87) PCT Pub. No.: WO01/94878
PCT Pub. Date: Dec. 13, 2001

(65) Prior Publication Data
US 2003/0150270 A1 Aug. 14, 2003

(30) Foreign Application Priority Data
Jun. 9, 2000 (FR) .......................................... 00 07490

(51) Int. Cl.[7] .............................................. G01N 29/00
(52) U.S. Cl. ....................................................... 73/649
(58) Field of Search .......................... 73/649, 661, 662, 73/866.5, 105, 189, 660, 643, 579; 250/306; 382/315

(56) References Cited

U.S. PATENT DOCUMENTS

| | | | | |
|---|---|---|---|---|
| 4,106,333 A | * | 8/1978 | Salje et al. .................... 73/105 |
| 4,665,739 A | | 5/1987 | Mizuno ........................ 73/105 |
| 4,748,672 A | | 5/1988 | Nevill, Jr. et al. .......... 382/315 |
| 4,776,212 A | | 10/1988 | Parsons et al. ............... 73/105 |
| 5,047,633 A | | 9/1991 | Finlan et al. ................ 250/306 |
| 5,436,448 A | | 7/1995 | Hosaka et al. .............. 250/306 |
| 5,440,121 A | * | 8/1995 | Yasutake et al. ............ 250/306 |
| 5,519,212 A | | 5/1996 | Elings et al. ................ 250/306 |
| 5,646,339 A | * | 7/1997 | Bayer et al. .................. 73/105 |
| 5,672,929 A | | 9/1997 | Gutsell et al. .............. 310/319 |
| 5,681,987 A | | 10/1997 | Gamble ....................... 73/105 |
| 5,789,666 A | * | 8/1998 | Bayer et al. .................. 73/105 |
| 5,801,381 A | | 9/1998 | Flecha et al. ............... 250/306 |
| 5,834,643 A | * | 11/1998 | Cheng ......................... 73/105 |
| 5,965,881 A | | 10/1999 | Morimoto et al. .......... 250/234 |
| 6,246,054 B1 | * | 6/2001 | Toda et al. .................. 250/306 |
| 6,566,653 B1 | * | 5/2003 | Gerber et al. ............... 250/288 |

FOREIGN PATENT DOCUMENTS

| | | |
|---|---|---|
| JP | 60135810 | 12/1983 |
| JP | 10269868 | 3/1997 |

\* cited by examiner

*Primary Examiner*—Hezron Williams
*Assistant Examiner*—Tamiko Bellamy
(74) *Attorney, Agent, or Firm*—Davis & Bujold, P.L.L.C.

(57) ABSTRACT

A device for evaluating the surface condition of a material and a method derived from it, based on the use of an element which vibrates under the influence of relative movement with respect to the surface to be assessed. This method allows the analysis of any surface, with or without surface periodicity, regardless of its constitution or its composition, and regardless of any surface treatment(s) it may have undergone. The evaluation device (1) comprises a support (2) to which is attached at least one vibrating element (3) capable of vibrating upon contact with the surface of the material surface (5), the vibrating element (3) being driven to move relative to the material surface (5). The evaluation device (1) also comprises a mechanism (4) for measuring the particular vibrating modes by the vibrating element (3) which furnishes a signal corresponding to a particular vibration modes, a device (6) for processing and analyzing the signal which produces one or more elements of data characterizing a surface condition, and an interface (7) which display the one or more elements of data.

13 Claims, 5 Drawing Sheets

METHOD AND DEVICE FOR ASSESSING THE SURFACE CONDITION OF A MATERIAL

FIELD OF THE INVENTION

The present invention concerns a device for assessing the surface condition of a material and a method using said assessment device, especially for characterizing the softness to touch of a material.

BACKGROUND OF THE INVENTION

It is important in several domains to determine the surface condition of a material or changes in the surface condition. The condition depends upon the material under consideration: fibrous material; textile; human or animal skin; human or animal hair or fur; paper for writing, printing, cleaning, hygiene, or packaging; metal, animal, mineral or vegetable material; wood; or plastic materials. For example, in textile manufacturing, fabric treatment might cause the appearance of microfibers, which increases fabric softness. In certain cases it is useful to quantify the modifications to the surface of a material in order to determine a measurement of softness to the touch. By way of example, this measurement of softness to touch may be used by manufacturers of laundry products, detergents, and household products to test the quality of their products just as it is done in the cosmetics industry.

At the present time a first type of apparatus for measuring the topography of the surface to be analyzed exists, for example, an apparatus using an optical, mechanical, or imaging method. The surface profile is then studied using several techniques:

Statistical methods: in this case, the profile is considered as a population of elements defined by two or three coordinates. Analysis concerns first, the height of the asperities (average, deviation from average, disparity-type, obliqueness, fineness, etc.) and then their distribution over the surface (average distance between two asperities, etc.)

The usual methods: used in signal processing, such as frequency analysis, temporal analysis, time-frequency analysis, etc.

Chaotic methods: such as fractal analysis.

A second type of apparatus exists which directly measures the behavior of a surface when it is rubbed using a mechanical palpator. In this case, the measured signal is studied in a transitory or permanent regime with the usual signal processing methods, the statistical or chaotic methods cited above.

Each of these different investigatory methods has its disadvantages. The statistical methods used to measure topography or rubbing actually lack the sensitivity required for certain applications because the information is gathered as a whole and important differences in the surface state may be buried in the signal, resulting in an analysis that lacks discrimination. Moreover, it is necessary to determine what is the most sensitive parameter of the surface for analysis, and it is rather difficult to extract a unique, universal parameter.

Insofar as the usual signal processing methods are concerned, they may be very precise in the case of periodic surfaces but they do not adapt well to non-periodic surfaces. Furthermore, they use comparative methods and never absolutes.

Finally, chaotic methods, particularly calculation of fractal dimensions, have the same disadvantages as statistical analysis because they consider all the data resulting from the measurement.

Numerous applications using these methods are known. However, these applications are not based upon actual analysis of an element vibrating in contact with the surface.

This is the specific case with the device described in publication number JP-A-10 269 868 for measuring the rugosity of an electrical cable displaced under a flexible plate. This device merely measures the deflection of the flexible plate.

This is also the case with the device described in publication number U.S. Pat. No. 5,672,929 for detection of vibrations generated by displacing a support such as a sheet of paper. The vibrations are then analyzed to determine contact and movement, but not the surface condition of the support.

SUMMARY OF THE INVENTION

The present invention proposes remedying these problems with an evaluation device and a method for analyzing a surface which may or may not have surface periodicity, characterizing it using one parameter, and comparing surfaces of completely different structures, textures, component materials, and possible surface treatments.

The present invention comprises a support to which at least one vibrating element is attached and is capable of vibrating upon contact with the surface of the material, with the vibrating element moving relative to the surface of the material. The evaluation device also comprises a means for measuring the particular vibration modes of the vibrating element in order to furnish a signal corresponding to said particular vibration modes, a device for processing and analyzing the signal in order to extract at least one element of data about the surface condition, as well as an interface to display the one or more elements of data.

In a particularly advantageous manner, the evaluation device may comprise a second processing device for transforming said data characterizing the surface condition into a value quantifying the material's softness to touch as a function of at least one predefined criterion.

The material may be selected from the group comprising metals, organic, mineral, natural or artificial material, synthetic material, or a composition of several of these materials. In particular, it may be a living material, such as skin or hair.

The vibrating element may be selected from the group comprising metals, organic, mineral, natural or artificial material, synthetic material, or a composition of several of these materials.

The means for measuring the particular vibration modes of the vibrating element may consist of sensors which measure at least one physical dimension associated with the vibrating element, such as kinematic dimensions (displacement, speed, acceleration) or dynamic dimensions associated with the vibrating element (force, moment) or with the material (constraint, deformation, deformation speed). The sensors may also measure at least one dimension associated with the corresponding environment (acoustical and thermal dimensions). The sensor or sensors are founded on a technology selected from a group comprising at least the following technologies: mechanical, acoustical, electrical, electrostatical, electromagnetic, electronics, optical, optoelectronic, chemical, thermal, radioactive, or a combination of these technologies, using fluid as the media, the state of the fluid being chosen from the group comprising at least the viscous, liquid, or gaseous state.

Advantageously, the signal processing and analysis device produces signal analysis using a method selected from the group comprising at least mathematics or physics.

The analysis method is preferably a physics method designed to effect signal transformation selected from the group comprising at least Fourier transformation, time-frequency transformation, or wave transformation. Any other mathematics or physics method of analyzing an analog, discrete, quantified, or digital signal may also be used.

The vibrating element is attached to a support at an angle with a mechanical connection selected from the group comprising one of the following mechanical connections: unidirectional or bidirectional pivot, sliding pivot, spherical pivot with a finger, spherical pivot without a finger, linear, sliding, plane abutment, or point abutment, allowing it between 0 and 5 degrees of movement.

In a particularly advantageous method, the evaluation device of the invention comprises a protective housing for the vibrating element and its support, said housing comprising at least one opening for a portion of the vibrating element to pass through. The means for measuring the particular vibration modes, the processing and analysis device, and the interface may be partially or completely contained within the housing.

The invention also concerns a method using the evaluation device described above in which said evaluation device is move relative to the material so as to cause the vibrating element to vibrate, the particular modes of vibration by the vibrating element are measured using said means for measuring particular modes of vibration, and the resulting signal is processed and analyzed using the processing and analysis device in order to obtain at least the data corresponding to the surface condition of the material.

In a particularly advantageous embodiment, said data characterizing the surface condition of the material may be transformed into at least one value quantifying the softness to touch of the material according to at least one predefined criterion.

BRIEF DESCRIPTION OF THE DRAWINGS

The advantages of the present invention will be more readily apparent from the following description of several embodiments, with reference to the attached drawings, in which.

DETAILED DESCRIPTION OF THE INVENTION

Figure 1:
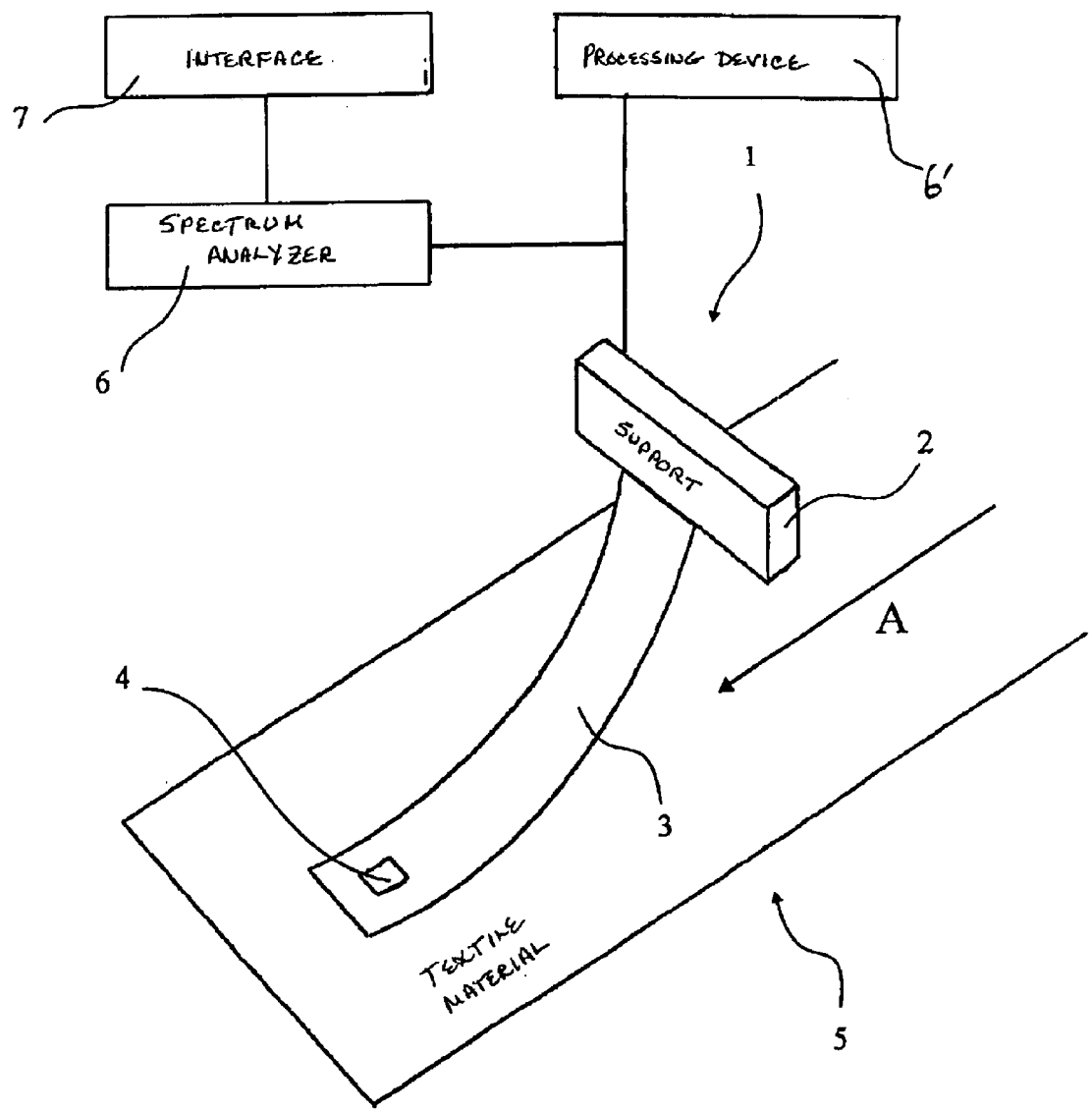
FIGS. 1 through 3 are schematic illustrations of three embodiments and the use of the evaluation device according to the invention.

With reference to FIG. 1, evaluation device 1 of the invention is used to measure the surface condition of a textile material 5 that is moving rectilinearly in the direction of production shown by arrow A. Evaluation device 1 comprises a support 2 housing one extremity of a vibrating element consisting of a rectangular blade 3 made of very thin steel. Attached to said blade 3 there is an extensometric gauge 4 which constitutes the means for measuring the particular modes of vibration by blade 3 and which emits a signal corresponding to the particular modes of vibration by blade 3.

Evaluation device 1 is also equipped with a spectrum analyzer 6 connected to gauge 4 and constitutes a device for processing and analyzing the signal furnished by said gauge 4. Signal analysis isolates the frequencies and amplitudes of each particular vibration mode, each vibration mode being capable of providing different data and evolving differently according to how much energy is required by blade 3 to vibrate in the mode under consideration. The spectrum analyzer 6 is designed so that, via a Wheatstone type equilibrium bridge and processing the signal using Fourier transformation, for example, the spectral density of power as a function of the frequency of vibration by blade 3 is obtained. The spectrum obtained may be viewed directly on an Interface 7. The amplitude and energy of vibration shown on the spectrum provide data characterizing the surface state of the textile material. Signal processing may also be accomplished using time-frequency transformation and/or wave transformation.

Evaluation device 1 may also comprise a second processing device 6' transforming the data obtained from the angle of the spectrum into a value determined relative to a predefined scale as a function of the vibrating element or the means of vibration measurement, and according to the condition of the entire surface analyzed. The value thus obtained quantifies the softness to touch of the textile material 5 as a function of certain predefined criteria.

Evaluation device 1 is used according to the following method to perform on line measurements: support 2 is attached, for example, on an emerizer, above the textile material 5 moving in direction A. It is placed at a distance from moving textile material 5 such that the free end of blade 3 rubs against said textile material 5 and said blade 3 bends slightly. Because of the textile-plate interaction, the plate begins to vibrate in its particular modes. Extensometric gauge 4 then measures the relative deformations of blade 3 in the dynamic vibrating state and transmits the corresponding signal to the spectrum analyzer 6. Processing the signal provides a visual representation of the particular vibration modes of blade 3 as peaks of spectral power density at frequencies corresponding to these modes. The amplitude of these peaks is measured in $V^2/Hz$ and any variation in amplitude signifies a modification to the state of the surface being analyzed.

Figure 2:
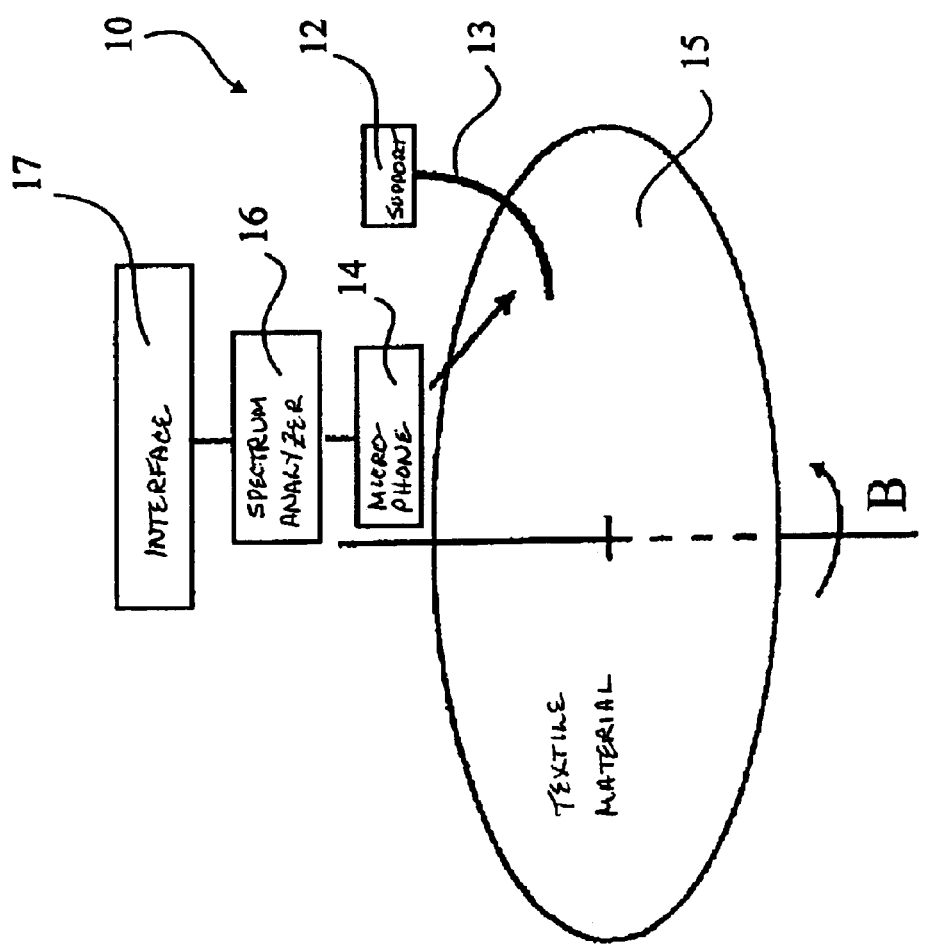

With reference to FIG. 2, evaluation device 10 according to the invention is used to measure the surface condition of a sample of textile material 15 attached to a revolving plate and moving in a circular direction according to arrow B for the purpose of performing laboratory measurements. Evaluation device 10 comprises a support 12 housing one extremity of a vibrating element consisting of rectangular blade 13 made of very thin polyvinyl chloride. In this variation, the means for measuring the particular vibration modes is a microphone 14 connected to an spectrum analyzer 16 which is itself connected to an interface 17.

Spectrum analyzer 16 is selected for the same purpose as spectrum analyzer 6, that is, to transform the signal emitted by microphone 14 into spectral power density as a function of frequency, with the result being displayed on interface 17.

Here again it is possible to provide in evaluation device 10 a second processing device which transforms the data obtained from the angle of the spectrums into a value determined in relation to a predefined scale as a function of the vibrating element or of the means for measuring particular vibration modes, according to the condition of the entire surface analyzed. The value obtained quantifies softness to touch of the sample of textile material 15 as a function of certain predefined criteria.

Evaluation device 10 is used according to the following procedure to perform laboratory measurements: support 12 is attached above textile material 15 moving in direction B. It is placed at a distance from moving textile material 15 so that the free end of blade 13 rubs against textile material 15 and said blade 13 bends slightly. Because of the textile-plate interaction, the plate begins to vibrate in particular modes. Next, in a silent atmosphere, microphone 14 is placed some millimeters away from the area where the plate rubs against the textile. Microphone 14 captures the displacements due to vibration of plate on an acoustical track and transmits a corresponding signal to spectrum analyzer 16. Using Fourier transformation, for example, processing the signal furnishes the spectral density of power as a function of the frequency, and the particular modes of plate vibration are represented visually by the peaks of spectral density of power at frequencies corresponding to these modes. The amplitude of these peaks is measured in $Pa^2/Hz$ and any variation in amplitude signifies a modification in the condition of the surface being analyzed. In this case also, another transformation can be used, such as time-frequency or waves, for signal processing.

Figures 4, 5:
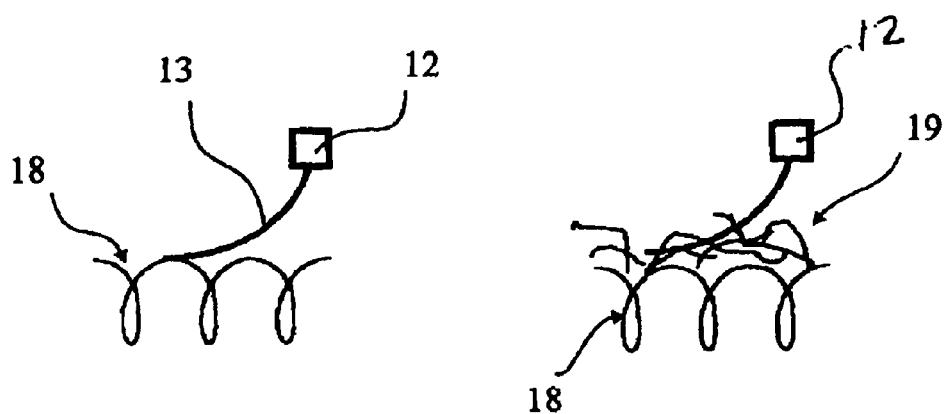
FIGS. 4 and 5 represent the surface condition of a material before and after treatment, respectively.

To illustrate this method, FIG. 4 illustrates a sweater 18 before scraping and FIG. 5 shows the same sweater 18 after passage through the scraping device. This machine is equipped with metallic claws below which sweater 18 passes and which lift numerous fibers emerging from the sweater, forming a napped surface 19. Thus, the scraped sweater is very soft to touch.

Figure 6:
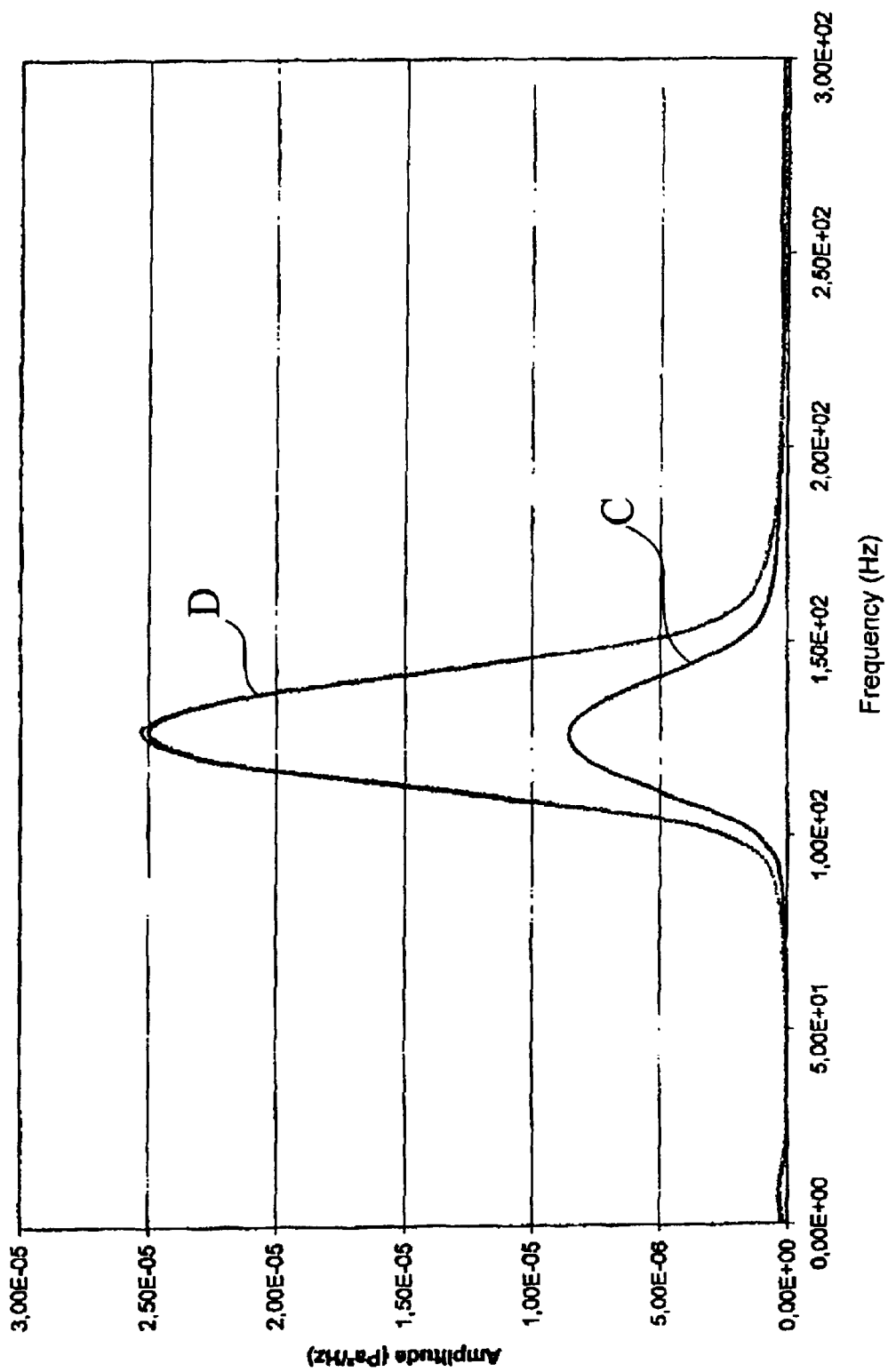
FIG. 6 represents the spectrums obtained after the method of the invention is applied using the evaluation device of FIG. 2.

With reference to FIG. 6, when blade 13 rubs against unscraped sweater 18, spectrum analyzer 16 furnishes curve C, with a spectral density of power as a function of frequency which has an amplitude peak of less than 1.00E–05 $Pa^2/Hz$.

When blade 13 rubs against scraped sweater 18, this abundant pile surface 19 provokes greater mechanical excitation and greatly amplifies the reaction of blade 13. The result is curve D with a spectral density of power as a function of frequency which has, at the same frequency, an amplitude peak equal to 2.50E–05 $Pa^2/Hz$.

This significant variation in amplitude between the peaks is indicative of a modification in the condition of the analyzed surface, in this case, increased softness to touch.

Figure 3:
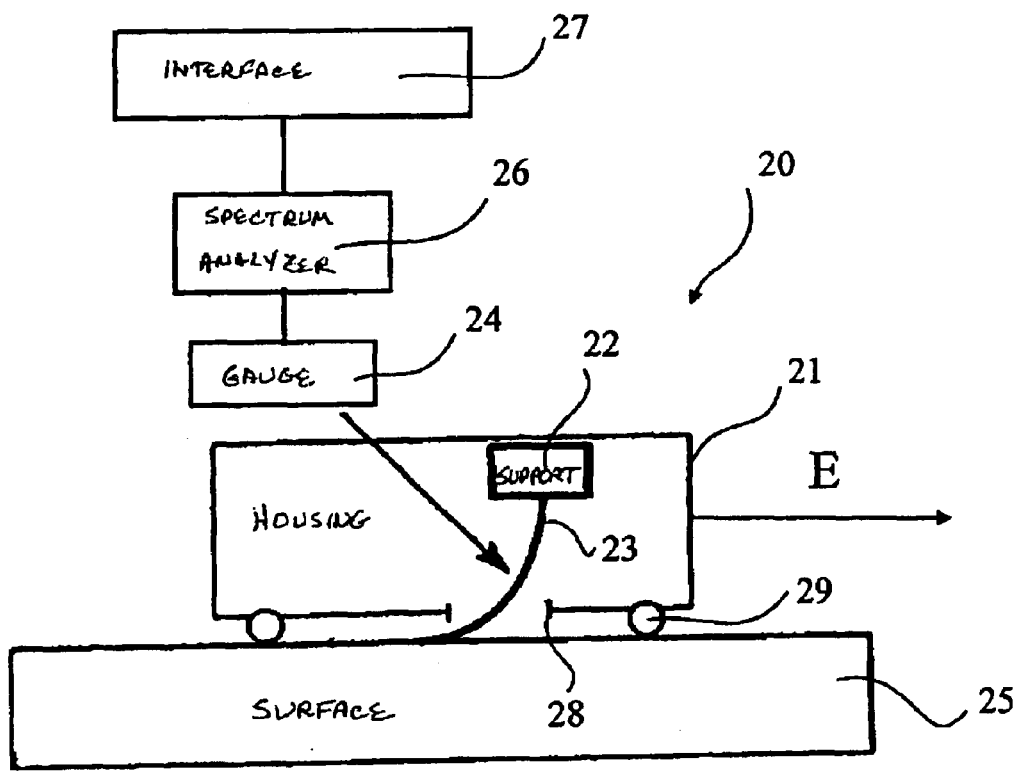

With reference to FIG. 3, evaluation device 20 of the invention is a portable apparatus used to measure the condition of a surface 25, either fixed or moving relative to device 20. Evaluation device 20 comprises a support 22 housing one end of a vibrating element consisting of a rectangular blade 23 made of very thin steel. In this variation the means for measuring the particular modes of vibration is a piezo-electric gauge 24 attached to blade 23 and associated with a spectrum analyzer 26, which is itself connected to an interface 27.

Spectrum analyzer 26 is selected for the same purpose as spectrum analyzers 6 and 16, that is to transform the signal emitted by the piezo-electric or piezo-resistive gauge 24 into spectral density of power as a function of frequency, with the result being visible on interface 27.

Here again it is possible to provide in evaluation device 20 a second processing device to transfer the data obtained from the angle of the spectrum into a value determined relative a predefined scale as a function of the vibrating element or of the means of measuring the particular modes of vibration, and according to the condition of the entire analyzed surface.

Evaluation device 20 also comprises a housing 21 enclosing support 22, a blade 23, a gauge 24, a spectrum analyzer 26 and an interface 27, forming a compact device. Housing 21 comprises in its base an opening 28 for the passage of the free extremity of blade 23. It also is equipped with wheels 29 so evaluation device 20 can be easily displaced on the surface to be analyzed 25.

Evaluation device 20 is used according to the following procedure: the operator moves housing 21 along the surface 25 to be analyzed in the direction indicated by arrow E. Support 22 is attached in housing 21 at a height allowing the free extremity of the blade 23, which extends through opening 28, to rub against the surface 25 to be analyzed while blade 23 bends slightly. Because of the interaction between the plate and the textile, the plate begins to vibrate in its particular mode. Piezo-electric gauge 24 measures variations in constraint relative to the dynamic vibrating state of blade 23 and transmits a corresponding signal to spectrum analyzer 26. Using a Fourier transformation, for example, to process the signal, furnishes the spectral density of power as a function of frequency and a visual display of the particular modes of vibration by the plate as peaks of spectral power density at the frequencies corresponding to these modes. The amplitude of these peaks is measured in $V^2/Hz$ and any variation in amplitude signifies a modification of the condition of the analyzed surface. Moreover, other transformations such as time-frequency or wave transformation may be used to process the signal.

Figure 7:
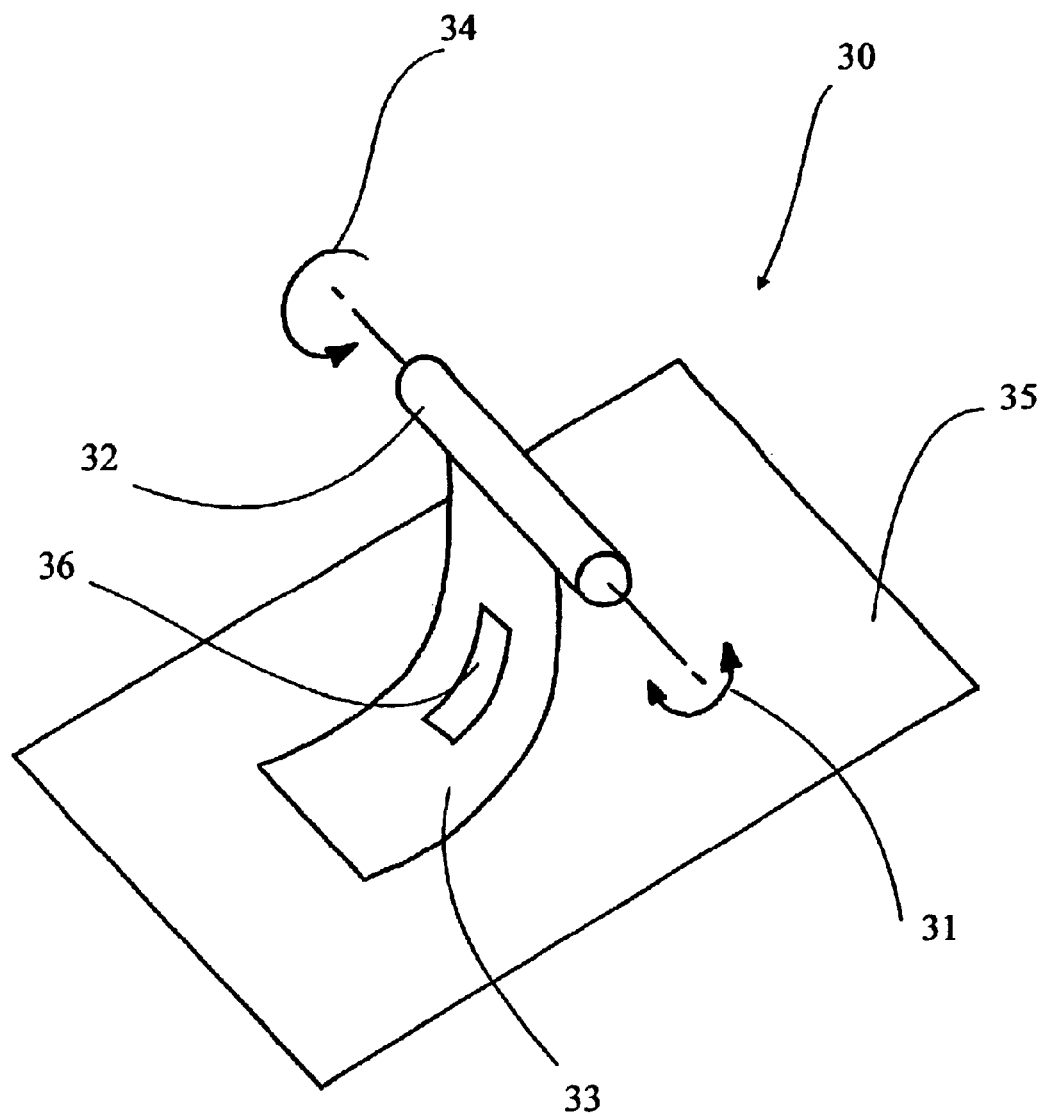
FIG. 7 shows a variation in the embodiment of the evaluation device of the invention.

With reference to FIG. 7, evaluation device 30 according to the invention, which may be portable, takes the form of a housing (not shown) and is used to measure the surface condition of a sample 35 which is either fixed or moving relative to device 30. Evaluation device 30 comprises a support 32 housing one extremity of a vibrating element consisting of a rectangular blade 33 made of very thin steel. Support 32 may take the form of a cylindrical bar. Said support 32 moves rotationally and may rotate continuously, as shown by arrow 34, or alternately, as shown by arrow 31. In this variation the means for measuring vibrations is a piezo-electric or piezo-resistive gauge 36 attached to blade 33 and associated with a spectrum analyzer (not shown) which is itself connected to an interface (not shown).

Thus, the evaluation device according to the invention and its method provide an analysis of the particular modes of vibration by a vibrating element moving in relation to a surface for analysis, regardless of its shape and material, and produces by this indirect measurement an assessment of the condition of various surfaces, regardless of their structure (periodic or not), their composition, or how they are obtained. These features cannot be obtained using current measurement methods, which directly analyze the reaction of the surface to some force, for example mechanical, optical, or electromagnetic force.

The present invention may be used in all endeavors where it is necessary to assess surface condition and especially, to evaluate its softness to touch, such as the textile and cosmetics fields, the automotive industry, the detergent and household products industry, and in manufacturing various objects. It can also be used to evaluate softness to touch of living systems such as skin or hair as a result of applying cosmetic products, since the evaluation device is capable of operating in vivo.

In particular, several vibrating elements may be provided in a single evaluation device. The vibrating element or elements may take numerous different forms. First, it may have a shape with two dimensions that are inconsequential relative to a third: a stem that may or may not be rigid, flat or curved, of any section, any shape, hollow, grooved, or solid. There may also be an assemblage of several rods supported in a manner known in the art.

The shape of the vibrating element may have one dimension that is inconsequential relative to the two others, for example, a blade or a flat beam that may or may not be rigid, flat, or curved, of any section or any shape, hollow, grooved, or solid, or an assemblage of several of these vibrating elements.

Finally, the shape of the vibrating element may have no inconsequential dimensions. In this case it may be any size, closed or not closed, rigid or not, flat or curved, of any section or any shape, hollow, grooved, or solid, or any assemblage of several of these shapes.

The shape of the vibrating element may be an assemblage of different shapes each having either one, two, or no dimensions that are inconsequential relative to the others.

The vibrating element may be made of materials other than those described above, namely a metal, organic, or mineral material of natural, artificial, or synthetic origin, or even a composition of several of these materials.

The vibrating element may be attached on a slant with one of the following mechanical connections: unidirectional or bidirectional pivot, sliding pivot, spherical pivot with or without a finger, linear, sliding, plane abutment, or point, allowing it between 0 and 5 degrees of movement.

The means for measuring the particular modes of vibration by the vibrating element may consist of sensors which measure:

kinematic values such as displacement, speed, acceleration;

dynamic values connected with the vibrating element such as force or moment, or associated with the material such as constraint, deformation, or deformation speed;

environmental values such as acoustics, thermal conditions, and radioactivity.

The sensor or sensors used are founded on the following technologies: mechanical, acoustical, electrical, electrostatical, electromagnetic, electronic, optical, optoelectronic, chemical, thermal, radioactive. It is also possible to use a viscous, liquid, or gaseous fluid as the media. A combination of these technologies is also possible.

For signal processing, it is possible to use any mathematics or physics method for analyzing an analog, discrete, quantified or digital signal.

The present invention is not limited to the exemplary embodiments described, but extends to any modification and variation obvious to one skilled in the art while remaining with the scope of protection defined in the attached claims.

What is claimed is:

1. An evaluation device (1, 10, 20, 30) for evaluating a surface condition of a material (5, 15, 25, 35); the evaluation device comprising:

a support (2, 12, 22, 32) having a vibration element (3, 13, 23, 33) attached thereto;

wherein the vibration element (3, 13, 23, 33) is bendable and a remote free end of the vibration element (3, 13, 23, 33) sufficiently contacting the surface of the material (5, 15, 25, 35) so as to arch the vibration element (3, 13, 23, 33), the vibration element (3, 13, 23, 33) being moved relative to the surface of the material (5, 15, 25, 35) to cause the at least one vibration element (3, 13, 23, 33) to vibrate;

a mechanism (4, 14, 24) carried by the vibration element (3, 13, 23, 33) for measuring particular modes of vibration of the vibration element (3, 13, 23, 22) and furnishing a signal corresponding to the particular modes of vibration;

a device (6, 16, 26) for processing and analyzing the furnished signal corresponding to the particular modes of vibration and producing data, corresponding to the furnished signal, indicative of the surface condition of the material (5, 15, 25, 35);

an interface (7, 17, 27) for displaying the data; and a second processing device (6') for transforming the data indicative of the surface condition of the material (5, 15, 25, 35) into a value quantifying softness of the surface condition of the material (5, 15, 25, 35).

2. The evaluation device according to claim 1, wherein the material (5, 15, 25, 35) is selected from the group comprising at least the following: a metallic material, an organic material, a natural mineral material, an artificial mineral material, a mineral material of synthetic origin, and compositions of at least two of these materials.

3. The evaluation device according to claim 1, wherein the vibration element (3, 13, 23, 33) is made of material selected from the group comprising at least the following: a metallic material, an organic material, a natural mineral material, an artificial mineral material, a mineral material of synthetic origin, and compositions of at least two of these materials.

4. The evaluation device according to claim 1, wherein the mechanism (4, 24, 34) for measuring particular modes of vibration of the vibration element (3, 23, 33) is a sensor which measures at least one physical value associated with the vibration element (3, 23, 33).

5. The evaluation device according to claim 30, wherein the mechanism (14) for measuring particular vibration modes by the vibrating element (13) is a sensor which measures at least one value associated with a corresponding environment.

6. The evaluation device according to claim 1, wherein the mechanism (4, 14, 24) for measuring particular modes of vibration of the vibration element (3, 13, 23, 33) employs technology selected from the group comprising:

mechanical technology, acoustical technology, electrical technology, electrostatical technology, electromagnetic technology, electronics technology, optical technology, optoelectronic technology, chemical technology, thermal technology, radioactive technology, and a combination of at least two of these technologies.

7. The evaluation device according to claim 1, wherein the signal processing and analyzing device (6, 16, 26) effects an analysis of the signal using a method selected from the group comprising at least a mathematics method and physics methods.

8. The evaluation device according to claim 1, wherein the signal processing and analyzing device (6, 16, 26) effects an analysis of the signal using a physics methods, and the physics method effects a transformation of the signal selected from the group consisting of at least Fourier transformation, a time-frequency transformation, and a wave transformation.

9. The evaluation device according to claim 1, wherein the vibration element (3, 13, 23, 33) is attached, via a mechanical connection, to the support (2, 12, 22, 32) at an angle, and the mechanical connection is selected from the group comprising: unidirectional pivot, a bidirectional pivot, a sliding pivot, a spherical pivot with a finger, a spherical pivot without a finger, a linear connection, a sliding connection, a planar abutment connection, and a point abutment connection allowing between 0 and 5 degrees of movement.

10. The evaluation device according to claim 1, wherein the evaluation device comprises a housing (21) which protects the vibrating element (23) and the support (22), and the housing (21) comprises at least one opening (28) therein which allows passage of a portion of the vibrating element (23) therethrough.

11. The evaluation device according to claim 10, wherein the mechanism (24) for measuring the particular vibration modes, the processing and analysis device (26), and the interface (27) are at least partially located within the housing (21).

12. A method of using an evaluation device (1, 10, 20, 30) for evaluating a surface condition of a material (5, 15, 25, 35); the evaluation device comprising: a support (2, 12, 22, 32) having a vibration element (3, 13, 23, 33) attached thereto; wherein the vibration element (3, 13, 23, 33) is bendable and a remote free end of the vibration element (3, 13, 23, 33) sufficiently contacting the surface of the material (5, 15, 25, 35) so as to arch the vibration element (3, 13, 23, 33), the vibration element (3, 13, 23, 33) being moved relative to the surface of the material (5, 15, 25, 35) to cause the at least one vibration element (3, 13, 23, 33) to vibrate; a mechanism (4, 14, 24) carried by the vibration element (3, 13, 23, 33) for measuring particular modes of vibration of the vibration element (3, 13, 23, 22) and furnishing a signal corresponding to the particular modes of vibration; a device (6, 16, 26) for processing and analyzing the furnished signal corresponding to the particular modes of vibration and producing data, corresponding to the furnished signal, indicative of the surface condition of the material (5, 15, 25, 35); and an interface (7, 17, 27) for displaying the data; the method comprising the steps of:

inducing relative motion between the evaluation device (1, 10, 20, 30) and the material (5, 15, 25, 35) to cause the vibration element (3, 13, 23, 33) to vibrate;

measuring at least one particular mode of vibration of the vibrating element using the mechanism (4, 14, 24) for measuring particular modes of vibration;

processing and analyzing the furnished signal, using the processing and analysis device (6, 16, 26), to obtain data, corresponding to the furnished signal, indicative of the surface condition of the material (5, 15, 25, 35); and transforming the data indicative of the surface condition of the material (5, 15, 25, 35) into at least one value quantifying the softness of the material (5, 15, 25, 35).

13. An evaluation device (1, 10, 20, 30) for evaluating a surface condition of a material (5, 15, 25, 35); the evaluation device comprising:

a support (2, 12, 22, 32) having a vibration element (3, 13, 23, 33) attached thereto;

wherein the vibration element (3, 13, 23, 33) is elastic and the elastic vibration element (3, 13, 23, 33) engaging with the surface of the material (5, 15, 25, 35);

the vibration element (3, 13, 23, 33) being moved relative to the surface of the material (5, 15, 25, 35) to cause solely the at least one vibration element (3, 13, 23, 33) to vibrate;

a mechanism (4, 14, 24) for measuring particular modes of vibration of the vibration element (3, 13, 23, 22) and furnishing a signal corresponding to the particular modes of vibration;

a device (6, 16, 26) for processing and analyzing the furnished signal corresponding to the particular modes of vibration and producing data, corresponding to the furnished signal, indicative of the surface condition of the material (5, 15, 25, 35);

an interface (7, 17, 27) for displaying the data.

* * * * *